No. 636,323. Patented Nov. 7, 1899.
L. K. DAVIS.
FILTERING DEVICE.
(Application filed Mar. 9, 1899.)
(No Model.) 3 Sheets—Sheet 2.
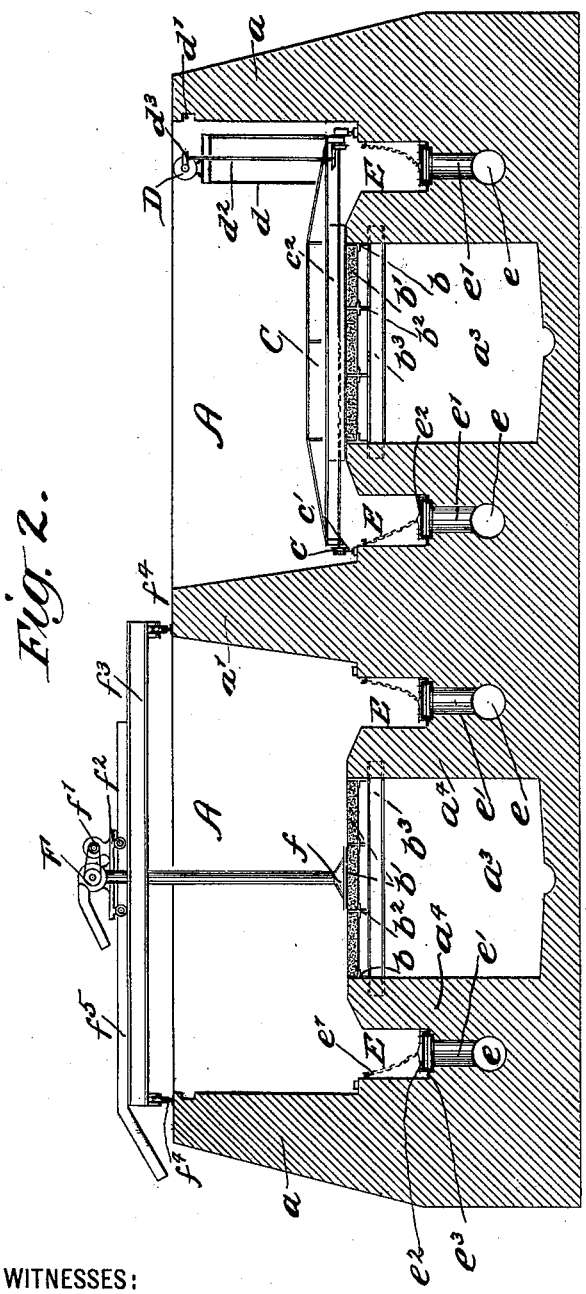
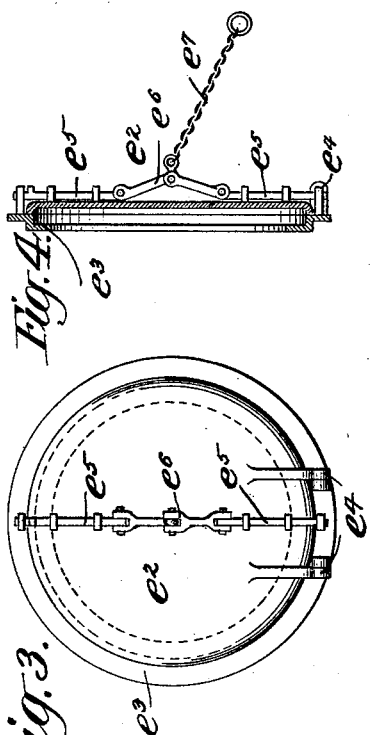
WITNESSES:
INVENTOR
Lewis K. Davis.
BY
HIS ATTORNEY

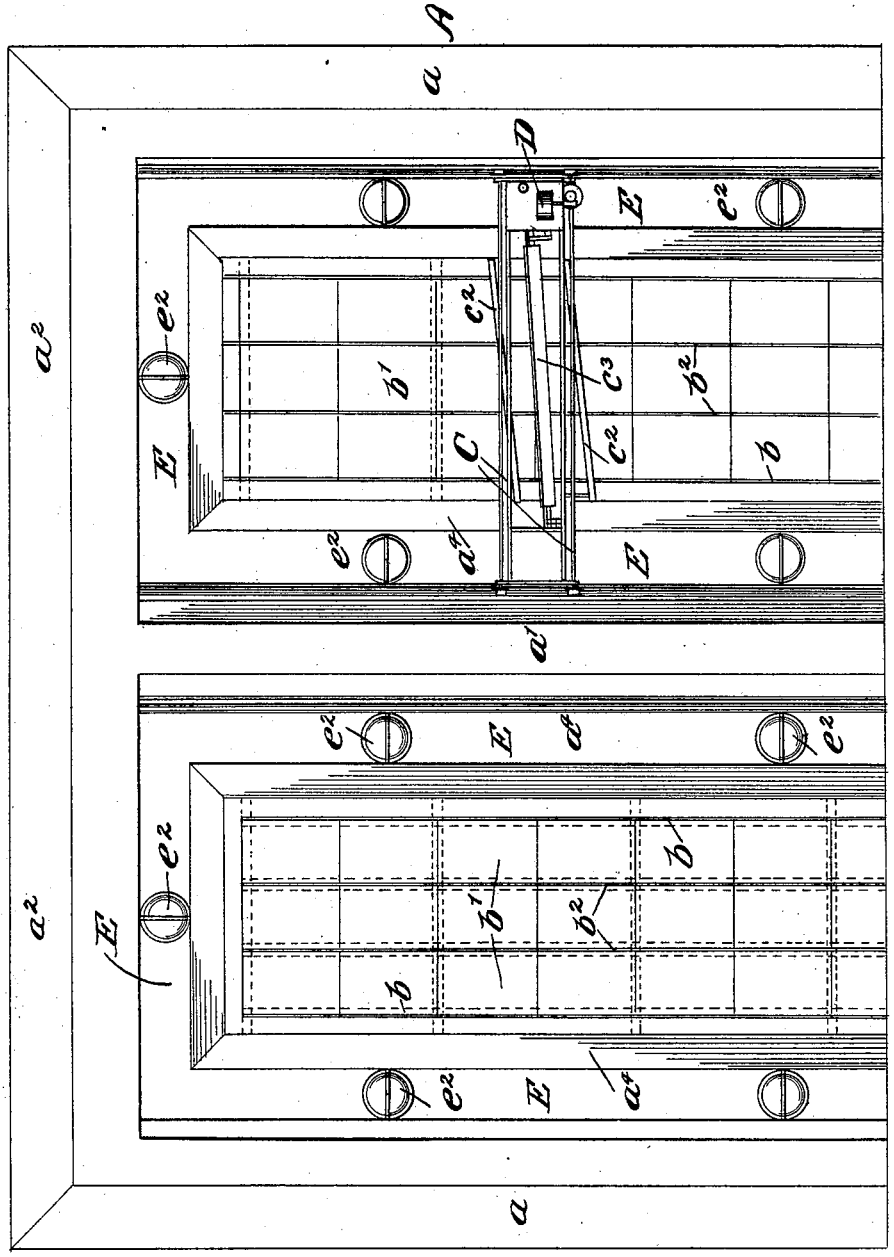

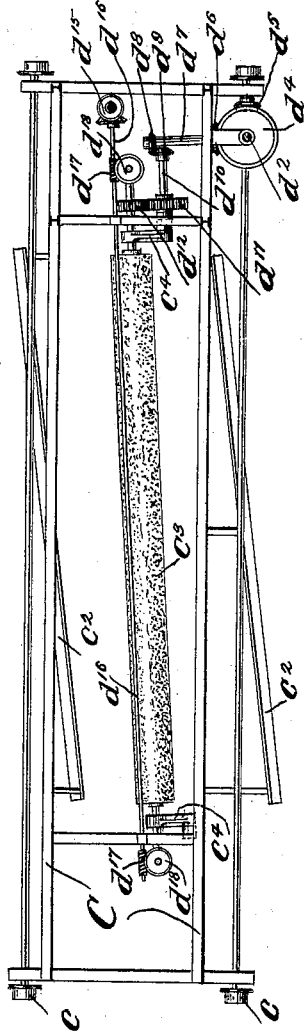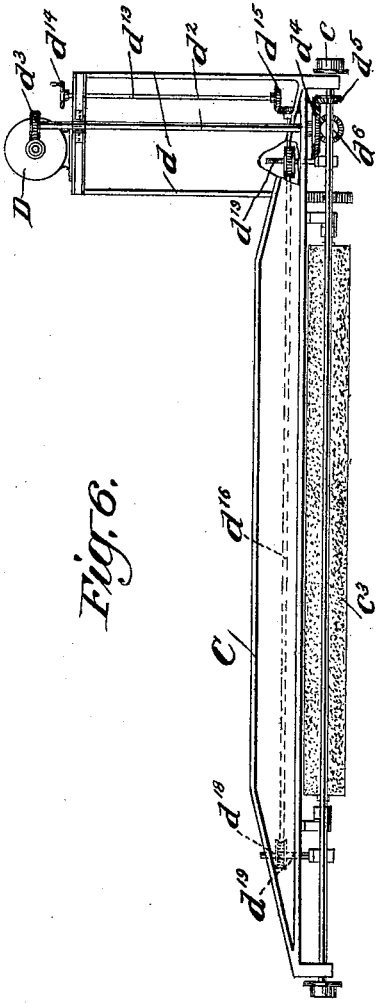

UNITED STATES PATENT OFFICE.

LEWIS K. DAVIS, OF NEW YORK, N. Y., ASSIGNOR TO GRACE P. DAVIS, OF SAME PLACE.

FILTERING DEVICE.

SPECIFICATION forming part of Letters Patent No. 636,323, dated November 7, 1899.

Application filed March 9, 1899. Serial No. 708,355. (No model.)

*To all whom it may concern:*

Be it known that I, LEWIS K. DAVIS, of the borough of Manhattan, city, county, and State of New York, have invented certain new and useful Improvements in Filtering Devices, of which the following is a specification.

My improvement relates to a filtering device designed principally for use in connection with waterworks for cities or other places.

I will describe a filtering device embodying my invention, and then point out the novel features thereof in the claims.

In the accompanying drawings, Figure 1 is a top view of a part of two filtering devices embodying my invention. Fig. 2 is a vertical transverse section thereof. Fig. 3 is a top view of a cover used in the filtering device. Fig. 4 is a sectional view thereof. Fig. 5 is a part top view and a part horizontal sectional view of the cleaning and scraping device shown in Fig. 6. Fig. 6 is a side elevation of a cleaning and scraping device employed in connection with this invention. Figs. 3, 4, 5, and 6 are drawn to a larger scale than Figs. 1 and 2.

Similar letters of reference refer to corresponding parts throughout the drawings.

A represents a basin or reservoir constructed of any suitable material and of any desired size. In the drawings I have shown two such basins or reservoirs, though any number may be employed. With this arrangement filtration may be stopped in one or more basins to permit of such basins being cleaned without wholly stopping the filtering of water for the waterworks. Each basin is constructed with side walls $a\ a'$ and end walls $a^2$ and with a channel $a^3$, which may be formed by walls $a^4$, intermediate the walls $a\ a'$. Where more than one basin is used, either of the side walls $a\ a'$ may be common to adjacent basins. The channel $a^3$ is closed or covered at its top, through which covering the water is filtered, so that within the channel $a^3$ only filtered water is contained. The filtered water is led from the channel $a^3$ to the service-pipes or to a reservoir. If desired, the water may be led away to be again filtered.

The covering for the channel $a^3$ preferably comprises a metal frame $b$ and blocks of filtering material $b'$. These blocks are supported within the frame $b$ by means of cross-bars $b^2$, which are of such shape as to support the blocks at their edges. The frame $b$ is supported between the walls $a^4$ by means of bars $b^3$, the ends of which are embedded in the walls $a^4$. Cement is employed to seal the spaces between the edges of the blocks and their supporting-bars and between the walls $a^4$ and the frame $b$ for the purpose of preventing any water entering the channel $a^3$ except through the filtering-blocks.

The water to be filtered is introduced into the basin or basins in any desired manner, which are filled to any desired height, which may be maintained at all times or not, as desired. As the water filters through the blocks the sediment and other matter contained in the water is prevented from passing into the channel $a^3$ by the filtering-blocks. To prevent the blocks from becoming clogged and the sediment and other matter accumulating on the filtering-blocks, I provide a cleaning and scrubbing device for them. The preferred form of such a device is shown in the right-hand part of Fig. 2 and in Figs. 5 and 6. The cleaning and scrubbing device comprises a suitable frame C, which is mounted on rollers $c$, traveling on tracks $c'$, suitably supported in the side walls $a\ a'$. At each side of the frame C, I provide a scraper $c^2$. Each scraper is preferably diagonally arranged relatively to the frame, and they are also oppositely inclined to each other, so that as the frame is moved longitudinally of the basin in one direction a scraper will guide the sediment and other matter from off the covering into one channel or recess and when the frame is moved in the other direction the other scraper will guide the sediment and other matter into the other channel or recess. Between the scrapers $c^2$ I provide a brush $c^3$, the shaft of which is suitably journaled in swinging brackets $c^4$, carried by the frame C. This shaft is adapted to be rotated by a suitable motor, which also serves to give longitudinal movement to the frame C.

D represents a motor, preferably an electric motor, that is supported above the frame C and above the water in the basin by means of a suitable frame $d$. The motor receives its current through a trolley (not shown) which is in contact with a line conductor $d'$. $d^2$ represents a vertical shaft suitably journaled in the frames d and C, and $d^3$ a gear on said shaft, which is in engagement with the driving-shaft of the motor D. $d^4$ represents a bevel-gear on the lower end of the shaft $d^2$, which is in engagement with a bevel-pinion $d^5$ on an axle of two of the rollers or wheels of the frame C. This arrangement of gearing when operated produces the longitudinal movement of the frame C. $d^6$ represents a pinion also in engagement with the gear $d^4$, which pinion is on one end of a shaft $d^7$, which is suitably journaled in the frame C. At the other end of the shaft $d^7$ a pinion $d^8$ is fixed thereon, which pinion engages with a similar pinion $d^9$ on a shaft $d^{10}$. This shaft $d^{10}$ is suitably journaled in the frame C, and it carries a gear $d^{11}$, which meshes with a gear $d^{12}$ on the shaft of the brush. This arrangement of gearing when operated provides for the rotation of the brush. The motor is preferably reversible—that is, it can be driven in two directions.

I also provide means for adjusting the position of the brush vertically. These means may comprise a vertical shaft $d^{13}$, suitably journaled in the frame d and provided at one end with a hand-wheel $d^{14}$ and at its other end with a pinion $d^{15}$, which operates a shaft $d^{16}$. The shaft $d^{16}$ extends along the brush and is provided with worms $d^{17}$, engaging with worm-gears $d^{18}$, working on screw-threaded portions of rods $d^{19}$, carried by the ends of the brush-shaft. As the hand-wheel $d^{14}$ is turned in either direction the worms $d^{17}$, engaging with the gears $d^{18}$, cause the gears $d^{18}$ to raise or lower the rods $d^{19}$ through them.

The sediment and other matter that is removed from the covering of the channel $a^3$ is guided into a recess or channel E, provided on each side and end of the channel $a^3$. Directly beneath each channel E is a pipe or passage e, all of which are in communication with each other. The channels E and passages e are in communication with each other through vertical passages $e'$, which are provided at intervals in the length of the passages. Each of these passages is closed by a cover $e^2$, which fits on a seat $e^3$, located at the head of each passage. Each cover is hinged to its seat, as shown at $e^4$, and it is locked securely in place by means of sliding bolts $e^5$, which are reciprocated into and out of their keepers by a toggle $e^6$. A chain $e^7$ is connected with the toggle, so that when the cover is to be raised from its seat the toggle is operated by pulling on the chain to withdraw the bolts. A further pull on the chain will move the cover on its hinge to open the passage. The free end of the chain is within reach of an operator, as shown. When the covers are removed from their seats, the water in the basins escapes through the vertical passages into the horizontal passages e, carrying with it the dirt and sediment guided into the channels E by the scraper and brush. This water is led from the passages e in any desired way. If desired, a pump may be connected with the outlet of the passages e to assist in removing the dirt and other matter from the basin and passages.

At the left side of Fig. 2 I have shown a modified form of device for removing sediment and dirt from the filtering-covering of the channel $a^3$. This device comprises a suction device f, which travels over the covering, and a suction-pump F at the other end of the suction device. The pump is operated from a suitable motor $f'$. The pump and motor are carried by a truck $f^2$, which travels back and forth on a truck $f^3$ in a direction transversely of the basin. The truck $f^3$ travels longitudinally of the basin on rails $f^4$.

$f^5$ represents a trough into which the pump F discharges.

Any desired means may be employed for moving the trucks $f^2$ $f^3$, and the truck $f^3$ may be moved constantly or intermittently, and the same is true of the frame C in the form of device shown in Figs. 5 and 6.

The filtering-covering may be cleaned by reversing the direction of water through the basin—that is, water may be forced through the channel $a^3$ through the filtering-covering into the basin A. The water may then be withdrawn from the basin A through the channels E, the vertical passages $e'$, and longitudinal passages e.

What I claim as my invention is—

1. In a filtering device, the combination of a basin, a channel within said basin, a filtering-covering for said channel, a device for cleaning and scrubbing said filtering-covering and adapted to be moved over the same, and traveling means for carrying said device whereby the same is moved over the filtering-covering.

2. In a filtering device, the combination of a basin, a channel within said basin, a filtering-covering for said channel, means for removing sediment and other matter from said filtering-covering, and a recess or channel on each side of said first-mentioned channel into which the sediment and other matter is guided by the said means, substantially as described.

3. In a filtering device, the combination of a basin, a channel within said basin for containing filtered water, a filtering-covering for said channel, means for removing sediment and other matter from said filtering-covering, a recess or channel at each side of said first-mentioned channel into which the sediment and other matter is guided, and means for removing said sediment and other matter from said last-named channels, substantially as described.

4. In a filtering device, the combination of a basin, a channel within said basin for containing filtered water, a filtering-covering for said channel, a device for scraping and brushing sediment and other matter from said covering and means for moving said device over the covering, substantially as described.

5. In a filtering device, the combination of a basin, a channel within said basin for containing filtered water, a filtering-covering for said channel, a device for removing sediment and other matter from said covering, said device comprising a scraper and a brush, means for rotating said brush, and traveling means carrying said brush and scraper, whereby the brush and scraper are moved over and along the filtering-covering.

6. In a filtering device, the combination of a basin, a channel within said basin for containing filtered water, a filtering-covering for said channel, a device for removing sediment and other matter from said covering comprising a scraper and a brush, and means which travel independently of the covering for rotating said brush and at the same time moving the brush and scraper over said covering.

7. In a filtering device, the combination of a basin, a channel within said basin for containing filtered water, a filtering-covering for said channel, a device for removing sediment and other matter from said covering, a recess or channel on each side of said first-mentioned channel, a horizontal passage below each of said recesses or channels, vertical passages at intervals in said recesses or channels forming a communication between said recesses or channels, and horizontal passages and a removable closure for each of said vertical passages, substantially as described.

8. In a filtering device, the combination of a basin, a channel within said basin, a filtering-covering for said channel, a device for removing sediment and other matter from said covering, said device comprising a frame, scrapers and a brush carried by said frame, a motor, gearing between said motor and brush for rotating it, and gearing between said motor and frame for moving the frame longitudinally of the covering, substantially as described.

9. In a filtering device, the combination of a basin, a channel within said basin, a filtering-covering for said channel, a device for removing sediment and other matter from said covering, said device comprising a scraper, a brush, means for rotating said brush, and means for adjusting said brush vertically relatively to said covering, substantially as described.

In testimony whereof I have signed my name to this specification in the presence of two subscribing witnesses.

LEWIS K. DAVIS.

Witnesses:
RITA BRADT,
GEO. E. CRUSE.